United States Patent
Okutsu

(10) Patent No.: US 8,683,124 B2
(45) Date of Patent: Mar. 25, 2014

(54) DEVICE, CONTROL METHOD THEREOF, AND PROGRAM

(75) Inventor: Toshihisa Okutsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 12/954,144

(22) Filed: Nov. 24, 2010

(65) Prior Publication Data

US 2011/0131386 A1 Jun. 2, 2011

(30) Foreign Application Priority Data

Dec. 2, 2009 (JP) .................................. 2009-274369

(51) Int. Cl.
*G06F 12/00* (2006.01)

(52) U.S. Cl.
USPC ..................................... 711/115; 711/E12.08

(58) Field of Classification Search
USPC .......................................................... 711/115
See application file for complete search history.

(56) References Cited

U.S. PATENT DOCUMENTS

2009/0006747 A1 1/2009 Otsuka
2009/0052348 A1* 2/2009 Kato et al. .................... 370/254

FOREIGN PATENT DOCUMENTS

| JP | 2006-107244 A | 4/2006 |
| JP | 2006-268845 A | 10/2006 |
| JP | 2008-210154 A | 9/2008 |

\* cited by examiner

*Primary Examiner* — Reginald Bragdon
*Assistant Examiner* — Hamdy S Ahmed
(74) *Attorney, Agent, or Firm* — Canon USA Inc. IP Division

(57) ABSTRACT

An unmount state storing unit configured to store a state of unmount processing to end access processing to a memory card attached to a device from a host computer is provided. During a period from immediately after a host computer executes the unmount processing until detaching of the memory card is detected, a value of the host computer unmount state storing unit is stored as "true". During the period in which this value is "true", a host computer mount request from another host computer is denied. Consequently, after the access processing to the memory card attached to a device by the host computer has ended, contents of the memory card cannot be read from the other host computer while the memory card is still attached.

7 Claims, 15 Drawing Sheets

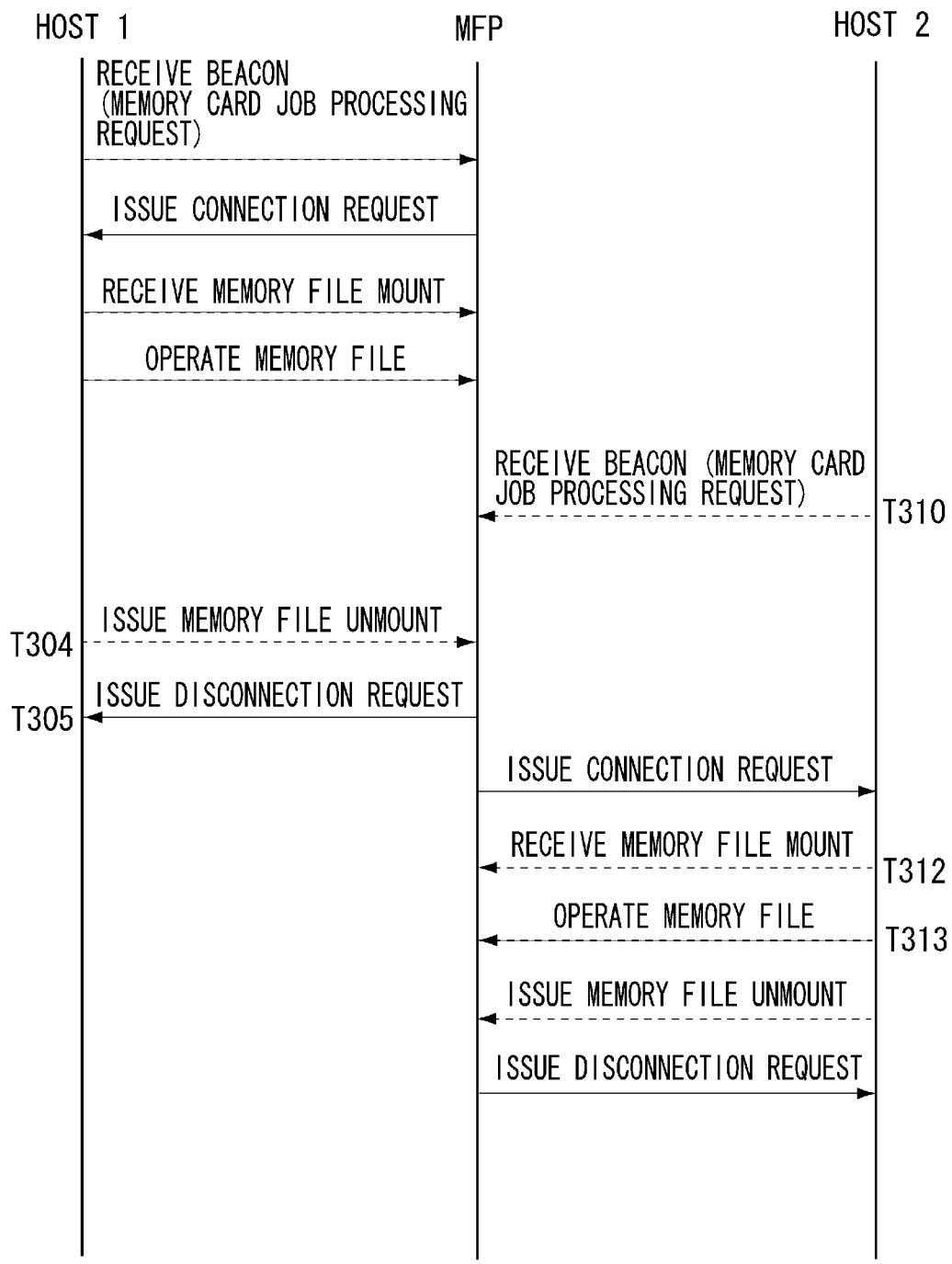

DEVICE, CONTROL METHOD THEREOF, AND PROGRAM

BACKGROUND OF THE INVENTION

1. Field of the Invention

The present invention relates to a device such as a digital multifunction peripheral (MFP), a control method thereof, and a program for realizing the control method.

2. Description of the Related Art

A wireless communication system for sharing a device, such as a single digital MFP, with a plurality of host computers has conventionally been generally known. The term "digital MFP" refers to a device in which a plurality of functions, such as copy, facsimile, printer, scanner, and memory card reader/writer, are consolidated in a single device.

In such a wireless communication system, a host computer has used a detachable memory card provided in the device as a file system. More specifically, in such a technique, a host computer which has established a wireless connection uses the contents of a memory card attached to the device as a file system. A user of the host computer can attach the memory card to a device provided with a memory card reader/writer, and perform reading and writing processing of the data on the memory card.

In such a wireless communication system, examples of security technology for data on a memory card include a technique described in Japanese Patent Application Laid-Open No. 2008-210154. In the technique described in Japanese Patent Application Laid-Open No. 2008-210154, information (specifying information) for specifying a host computer which can access the memory card is stored in the memory card in advance. When a device detects that the memory card has been attached, the device acquires the specifying information from the memory card. Then, using this specifying information as access control information, the device controls so that only access to the memory card from the host computer corresponding to the specifying information is permitted.

However, the wireless communication system which has an access control configuration for the memory card such as that in Japanese Patent Application Laid-Open No. 2008-210154 has the following drawbacks.

Since information (specifying information) for specifying the host computer needs to be stored in the memory card in advance, a user is forced to perform a troublesome operation to do that. Further, in some cases the specifying information may not be stored in the memory card to be used. In such a case, the same problem will occur as with a device that is not provided with a special access control configuration for a memory card. More specifically, during a period from immediately after the user of the host computer has attached the memory card to the device and finished reading and writing the data on the memory card until the memory card is detached, a user of another host computer can access the memory card. Consequently, there is a security problem with the information in the memory card.

This point will now be described in more detail by referring to a sequence diagram illustrated in FIG. 15.

A case will be considered in which, while a host computer 1 is accessing a memory card attached to a digital MFP, another host computer 2 issues a memory card job processing request (T310 in FIG. 15) to the digital MFP to try to access another person's memory card.

The host computer 1 issues a memory file unmount (T304) to the digital MFP to end use of the memory card as a file system, thereby completing access to the memory card. However, if the memory card remains mounted on the digital MFP, the digital MFP receives a memory card job from the other host computer 2. In other words, in response to the memory card job processing request (T310) issued from the other host computer 2, the digital MFP responds normally to the memory job from the host computer 2, such as a memory file mount (T312) or a memory file operation (T313).

SUMMARY OF THE INVENTION

The present invention relates to the following device, control method thereof, and program. More specifically, the present invention is directed to, after access by an external device to a memory card attached to a device is ended, enabling access to the memory card from another external apparatus to be reliably prevented.

According to an aspect of the present invention, a device which includes a communication unit configured to communicate with an external apparatus and a memory card control unit configured to detachably attach a memory card to the device and to control an operation of the memory card includes a unit configured to receive access processing to the memory card attached to the memory card control unit from the external apparatus connected to the communication unit, an unmount state storing unit configured to store a state of unmount processing to end the access processing by the external apparatus to the memory card, and an access control unit configured to control permission and denial of access from the external apparatus to the memory card attached to the memory card control unit based on information stored in the unmount state storing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 is a sequence diagram illustrating a processing sequence in a conventional wireless communication system.

DESCRIPTION OF THE EMBODIMENTS

Various exemplary embodiments, features, and aspects of the invention will be described in detail below with reference to the drawings.

Wireless Communication System According to An Exemplary Embodiment

Figure 1:
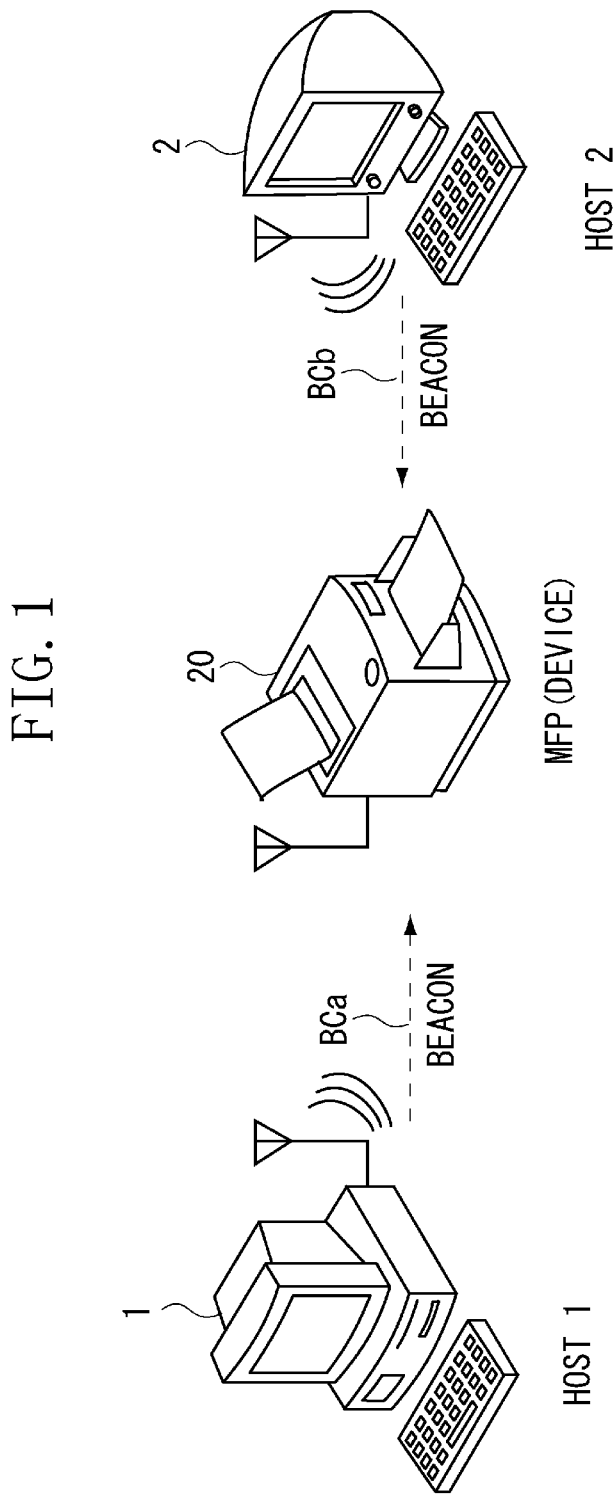
FIG. 1 is a schematic diagram illustrating a configuration of a wireless communication system according to an exemplary embodiment of the present invention.

FIG. 1 is a schematic diagram illustrating a configuration of a wireless communication system according to an exemplary embodiment of the present invention.

The wireless communication system is configured so that a single digital MFP (device) 20 is shared by a plurality of host computers 1 and 2. A one-on-one wireless universal serial bus (USB) communication connection is established between the host computers 1 and 2 and the digital MFP 20. In the present example, a case is described in which print data is respectively transmitted from the host computers 1 and 2 to the digital MFP 20.

The host computer 1 transmits a beacon BCa as a print job processing request to the digital MFP 20, and establishes a wireless communication connection. After wireless communication connection has been established, the host computer 1 transmits the print data to the digital MFP 20, and the digital MFP 20 processes the print data. After the print data processing has finished, the wireless connection is disconnected from the host computer 1 or the digital MFP 20.

On the other hand, the host computer 2 transmits a beacon BCb as a print job processing request to the digital MFP 20. At that point, the digital MFP 20 has established wireless communication with the host computer 1. Therefore, the digital MFP 20 disconnects the wireless communication with the host computer 1 after the print data therefrom has been processed, and subsequently establishes wireless communication connection with the host computer 2. The digital MFP 20 then processes the host computer 2 print data. After the print data processing has finished, the wireless connection is disconnected from the host computer 2 or the digital MFP 20.

Digital MFP (Device) Configuration

Figure 2:
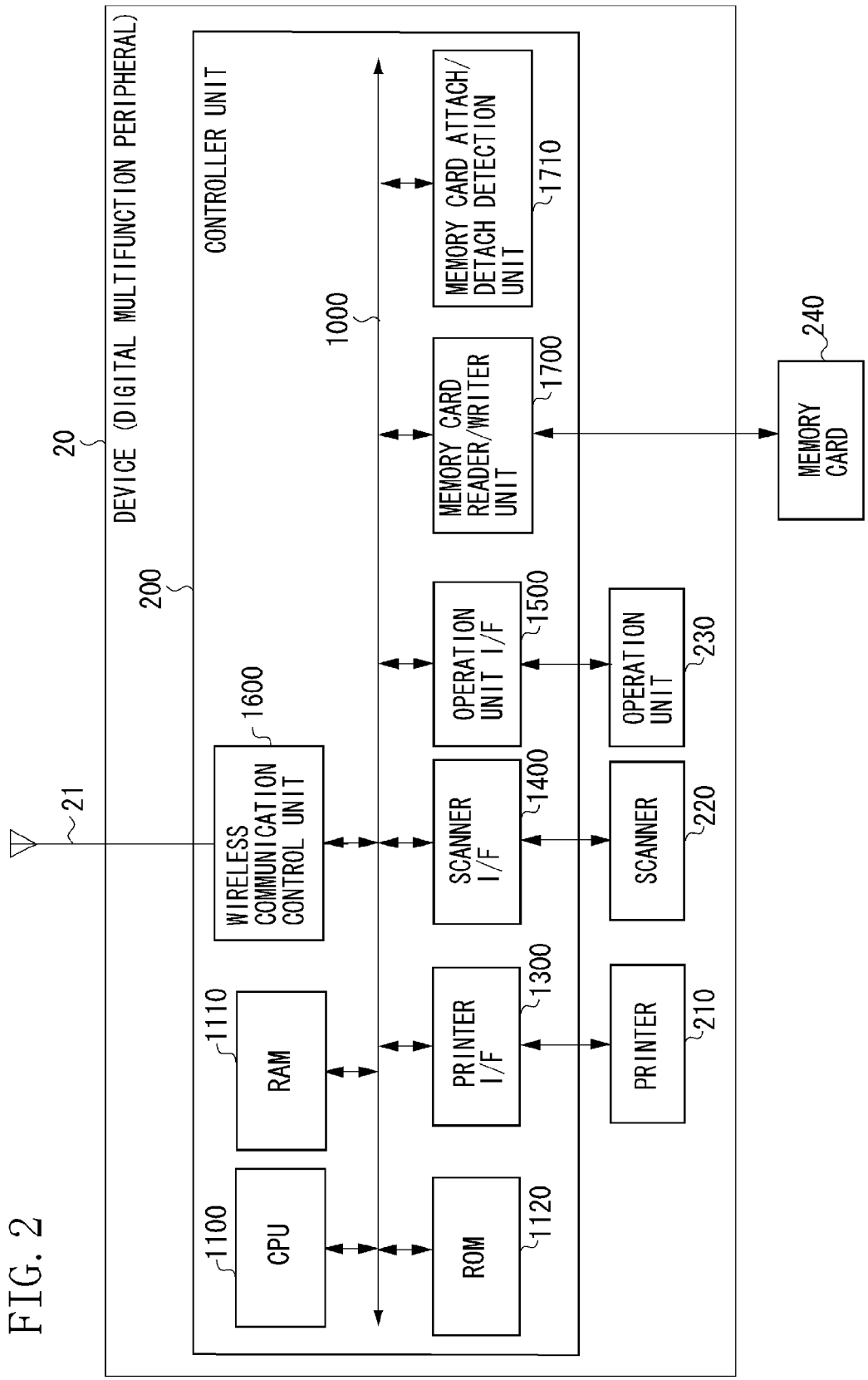
FIG. 2 is a block diagram illustrating a configuration of a digital MFP and a controller unit according to an exemplary embodiment.

FIG. 2 is a block diagram illustrating a configuration of a digital MFP, especially the configuration of a controller unit, which is an example of the device according to the present exemplary embodiment.

(A) Controller Unit Hardware Configuration

The digital MFP 20 includes a controller unit 200, a printer 210, a scanner 220, an operation unit 230, and the like.

The controller unit 200 is connected to the scanner 220, which is an image input device, and the printer 210, which is an image output device. In addition, the controller unit 200 performs input and output of image information and device information by connecting with a host computer via a wireless communication control unit 1600.

The controller unit 200 includes a central processing unit (CPU) 1100, a random access memory (RAM) 1110, a read-only memory (ROM) 1120, a printer interface (I/F) 1300, a scanner I/F 1400, an operation unit I/F 1500, and the wireless communication control unit 1600. Further, as characteristic configuration modules in the present exemplary embodiment, the controller unit 200 includes a memory card reader/writer unit ("card reader/writer") 1700, and a card attach/detach detection unit 1710. Each of these configuration modules is connected to an internal bus 1000.

The CPU 1100 is a controller which controls the entire system. The RAM 1110 is a system work memory for the CPU 1100 to operate, and is also an image memory for temporarily storing image data. The ROM 1102 is a program storage ROM in which a system boot program and system applications are stored.

The printer I/F 1300 is connected to the printer 210. In addition to performing communication with the CPU of the printer 210, the printer I/F 1300 performs synchronous to asynchronous conversion of the image data. The scanner I/F 1400 is connected to the scanner 220. In addition to performing communication with the CPU of the scanner 220, the scanner I/F 1400 performs synchronous to asynchronous conversion of the image data.

The operation unit I/F 1500 is an interface with the operation unit (user interface (UI)) 230. The operation unit I/F 1500 outputs the image data to be displayed on the operation unit 230 to the operation unit 230. Further, the operation unit I/F 1500 transmits to the CPU 1100 information input by a user of the system from the operation unit 230. The wireless communication control unit 1600 is connected to the host computer via an antenna 21 and performs input and output of the image data to be output and of information relating to device control.

The card reader/writer 1700 controls reading and writing of the contents of a detachable memory card 240 (example of a memory card control unit). In a case of storing a file of the image data or the like, the memory card 240 can store an image read by the scanner 220, so that the stored image can be printed by the printer 210. Further, a host computer which is wirelessly connected via the wireless communication control unit 1600 can mount (use) the memory card 240 as a file system and operate the file.

The memory card 240 attached to and detached from the digital MFP 20. The card attach/detach detection unit 1710 detects attaching and detaching of the memory card. More specifically, the card attach/detach detection unit 1710 detects whether the memory card 240 is attached to, or detached from, the card reader/writer 1700. As a specific example, the card attach/detach detection unit 1710 is provided with a connector for connecting a memory card, which produces an electric signal when the memory card is attached or detached.

(B) Digital MFP Software Configuration

Figure 3:
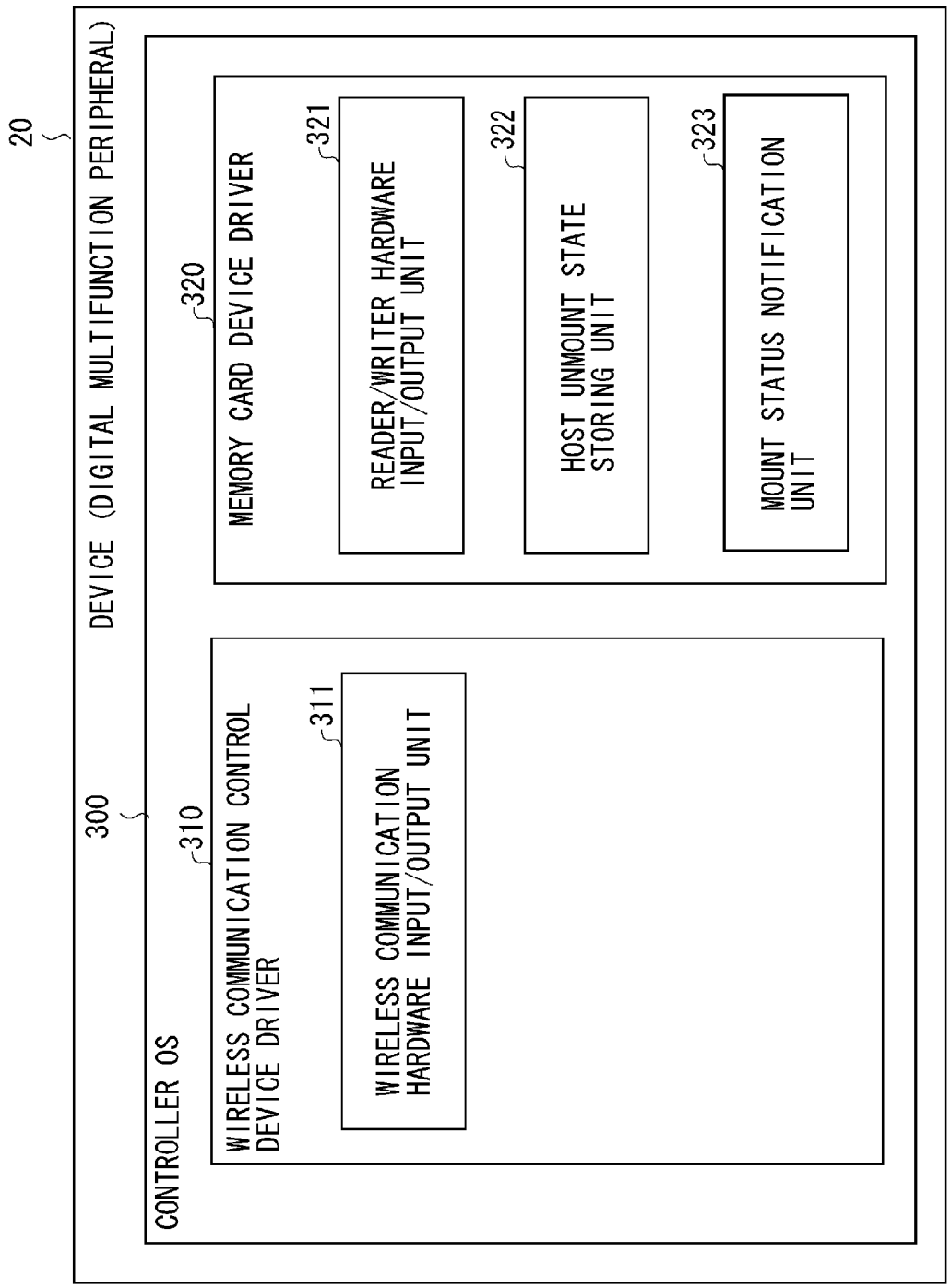
FIG. 3 is a block diagram illustrating a software configuration of a digital MFP according to an exemplary embodiment.

FIG. 3 is a block diagram illustrating a software configuration of the digital MFP 20 according to the present exemplary embodiment.

The software loaded in the digital MFP 20 is provided with a controller operating system (OS) 300 for performing general control of the device, such as image processing, print/scan processing, and communication processing with the host computer. The controller OS 300 is executed by the CPU 1100 and the RAM 1110 of the digital MFP 20.

The controller OS 300 includes a wireless communication control device driver 310 and a memory card device driver 320 which constitute characteristic features of the first exemplary embodiment. The wireless communication control device driver 310 is a driver for performing control processing of the wireless communication control unit 1600. The memory card device driver 320 is a driver for performing control processing of the card reader/writer 1700 and the card attach/detach detection unit 1710.

The wireless communication control device driver 310 includes a wireless communication hardware input/output unit 311 for performing hardware control of the wireless communication control unit 1600. The memory card device driver 320 includes a reader/writer hardware input/output unit 321, a host computer unmount state storing unit 322, and a mount status notification unit 323.

The reader/writer hardware input/output unit 321 is a module for performing hardware control of the card reader/writer 1700. The host computer unmount state storing unit 322 is a module for storing an unmount processing state of the host computer corresponding to the memory card attached to the card reader/writer 1700 as a flag value. The mount status notification unit 323 is a module for notifying the host computer of the mount status of the memory file system.

More specifically, when the host computer wirelessly connected to the wireless communication control unit 1600 executes unmount processing (i.e., processing for ending access to the memory card), the host computer unmount state storing unit 322 sets the stored flag value to "true" (valid). Then, when the card attach/detach detection unit 1710 detects detaching of the memory card, the flag value is set to "false" (invalid).

More specifically, during a period from immediately after the host computer executing unmount processing until detaching of the memory card is detected, the value of the host computer unmount state storing unit 322 remains "true". During the period in which the value of the host computer unmount state storing unit 322 is "false", a host computer mount request from the host computer is permitted, and during the period in which the value is "true", the host computer mount request from the host computer is denied.

The mount status notification unit 323 determines the state of the value stored in the host computer unmount state storing unit 322, and notifies the host computer via the wireless communication control unit 1600 of access permission or denial to the memory card 240 attached to the card reader/writer 1700.

Configuration of Host Computer (A) Hardware Configuration of Controller

Figure 4:
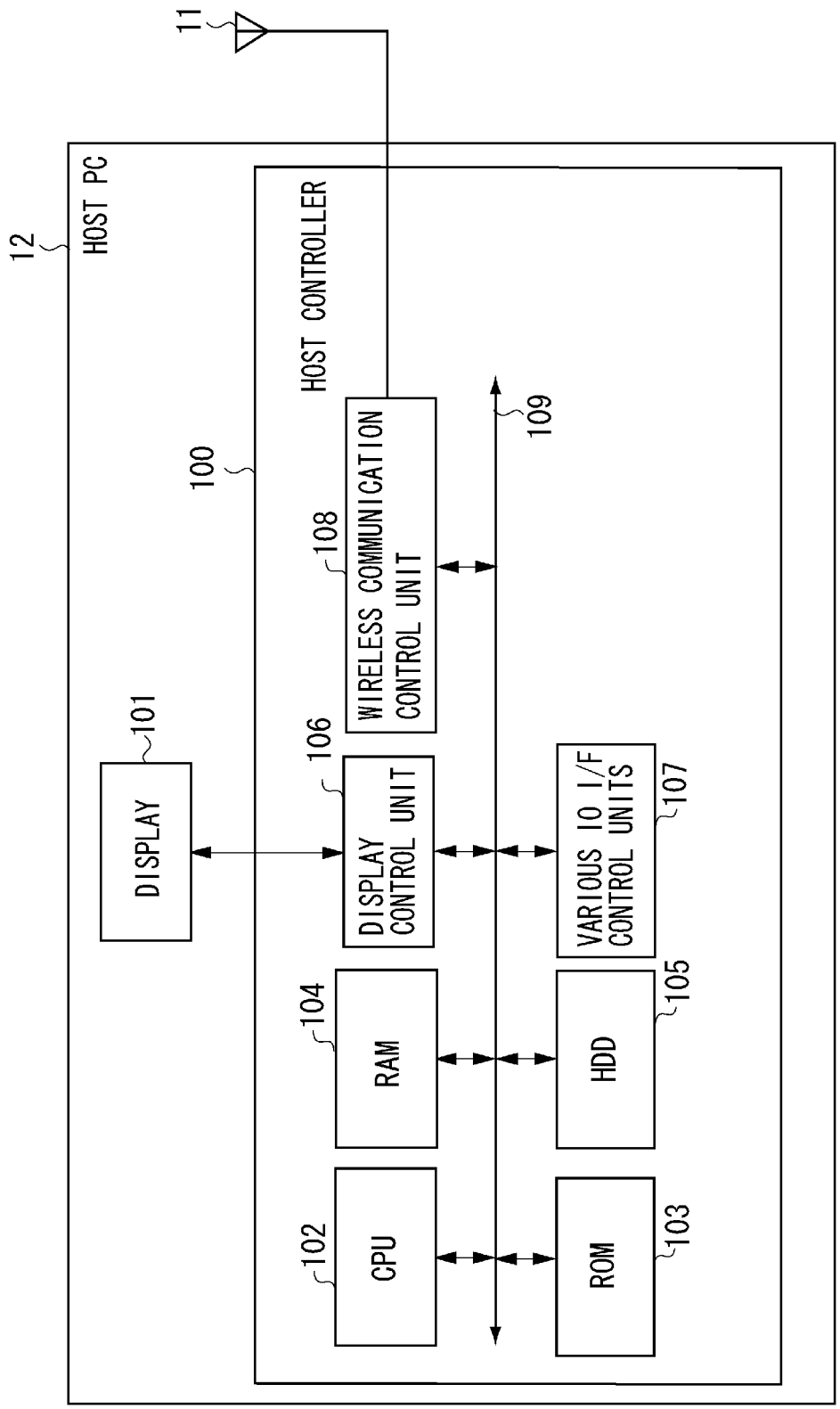
FIG. 4 is a block diagram illustrating a hardware configuration of a controller of a host computer according to an exemplary embodiment.

FIG. 4 is a block diagram illustrating a hardware configuration of a controller of the host computer (host controller) according to the present exemplary embodiment.

A host controller 100 is connected to a display 101, a keyboard, and a mouse (not illustrated). Further, the host controller 100 controls wireless USB communication via a host computer wireless USB antenna 11.

The host controller 100 includes a CPU 102, a ROM 103, a RAM 104, a hard disk drive (HDD) 105, a display control unit 106, various input-output (IO) I/F units 107, and a wireless communication control unit 108. These units are connected to a system bus 109.

The CPU 102 is a controller which controls the entire system, and performs overall control of the various processes being performed in the controller. The ROM 103 is a boot ROM in which a system boot program is stored. The RAM 104 is a system work memory for the CPU 102 to operate, and is also used as an image memory for temporarily storing image data, such as print data.

The HDD 105 is a hard disk drive that can store system software and image data. The display control unit 106 outputs the image data to be displayed on the display 101 to the display 101. Examples of the various IO I/F units 107 include an input/output I/F control unit, such as a not-illustrated keyboard or mouse which acts as a control unit for a wired USB and the like. Further examples of the various IO I/F units 107 include a control unit with a communication network and the like such as a local area network (LAN) (not illustrated). The wireless communication control unit 108 controls wireless USB communication via the host computer wireless USB antenna 11 when there is a device performing wireless USB communication externally.

(B) Software Configuration of Host Computer

Figure 5:
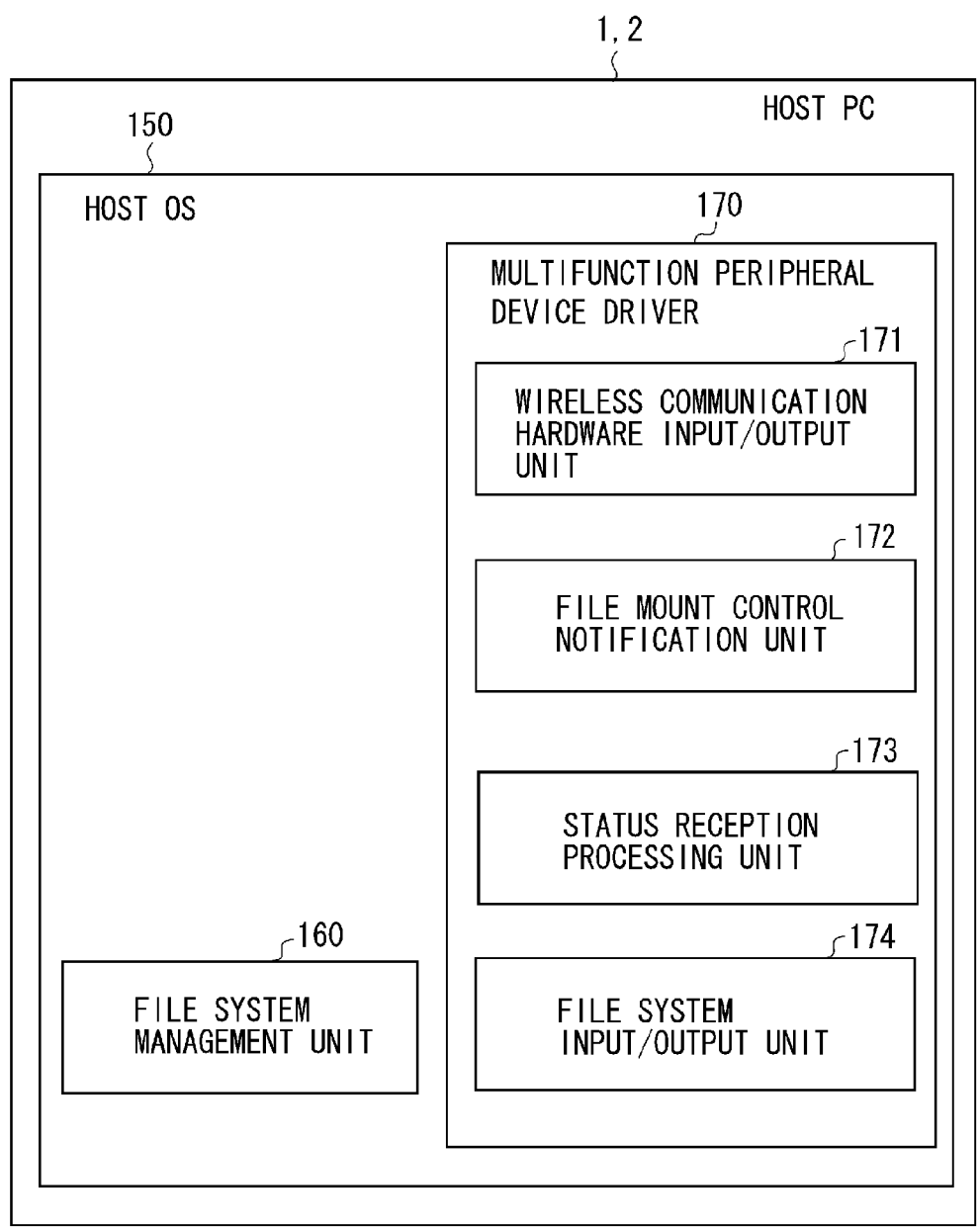
FIG. 5 is a block diagram illustrating a software configuration of a host computer according to an exemplary embodiment.

FIG. 5 is a block diagram illustrating a software configuration of the host computer according to the present exemplary embodiment.

A host computer OS 150, which is a characteristic feature of the present exemplary embodiment, includes a file system management unit 160 and a MFP device driver 170. The host computer OS 150 is executed by the CPU 102, RAM 104, ROM 103, and HDD 105 of the host computers 1 and 2 to control the whole device.

The file system management unit 160 manages the host computer file system. The file system management unit 160 not only manages the HDD in the device, but also manages a storage apparatus connected externally to the device as a file system. The present exemplary embodiment is based on the assumption of performing management processing when a memory card included in the digital MFP 20 is used as a file system.

The MFP device driver 170 is a driver for controlling the digital MFP via the wireless communication control unit 108. The MFP device driver 170 is configured from modules such as a wireless communication hardware input/output unit 171, a file mount control notification unit 172, a status reception processing unit 173, and a file system input/output unit 174.

The wireless communication hardware input/output unit 171 is a module for performing hardware control of the wireless communication control unit 108. The file mount control notification unit 172 is a module for notifying the digital MFP of a file system mount request. The status reception processing unit 173 is a module for notifying the file system management unit 160 whether a file system mount was successful or was not permitted based on a file mount status received from the digital MFP. The file system input/output unit 174 is a module for transferring file data between the digital MFP 20 and the file system.

Figure 6:
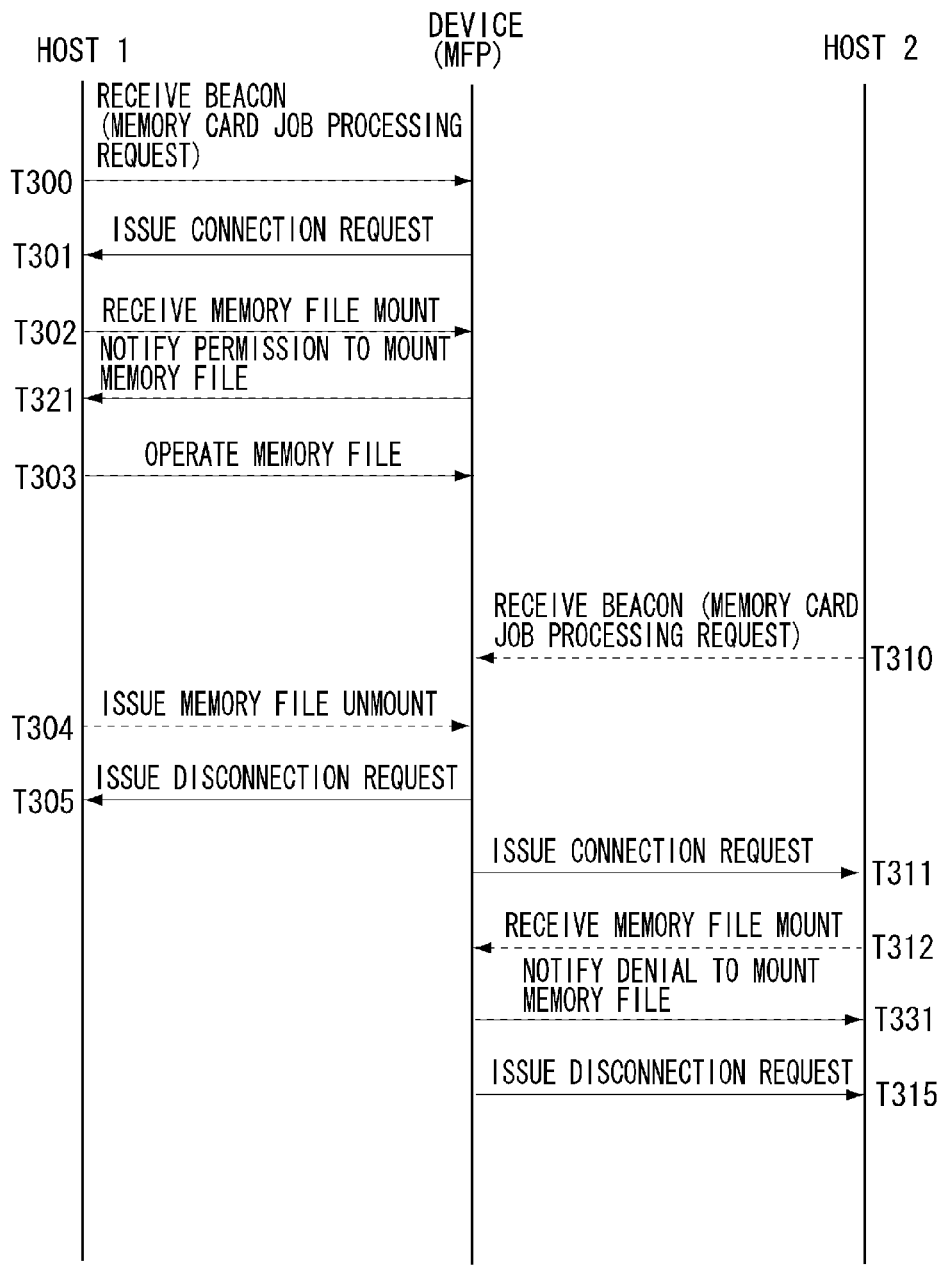
FIG. 6 is a sequence diagram illustrating a processing sequence according to an exemplary embodiment.

Device Side Processing (A) Processing Sequence According to the Exemplary Embodiment FIG. 6 is a sequence diagram illustrating a processing sequence according to the present exemplary embodiment. The sequence diagram in FIG. 6 corresponds to the sequence of FIG. 15 illustrating the conventional art described above. To clarify the comparison with FIG. 15, common elements are provided with the same reference numerals.

The characteristic sequence steps according to the present exemplary embodiment are a notification of memory file mount permission (T321) and a notification of memory file mount denial (T331) issued by the digital MFP 20 (device). Both of these notifications are issued by the digital MFP 20 to the host computer, and are mount status notifications indicating whether the memory file system can be used or not.

More specifically, with the digital MFP 20 in an initial state, the digital MFP 20 issues a memory file mount permission notification to the host computer. Subsequently, unless the memory card is detached after the memory card unmount, the digital MFP 20 issues a memory file mount denial notification against a memory file mount request from another host computer. Based on the sequence, during a period from after execution of a memory card job until detaching of the memory card from the digital MFP 20, access to the memory card from the other host computer can be restricted.

The sequence will now be described in more detail using FIG. 6. When the digital MFP 20 receives a memory card job processing request (T300), the digital MFP 20 issues a connection request to the host computer 1 (T301), and receives from the host computer 1 a memory file mount for requesting use of the memory card as the file system (T302).

Then, the digital MFP 20 which has received the memory file mount returns a memory file mount status as a status indicating whether use of the memory card as the file system is permitted or denied by the mount status notification unit 323 (T321). In the present example, a case is described in which a user of the host computer 1 is accessing the attached memory card for the first time, so that a memory file mount permission notification is issued to permit use of the memory card as the file system.

The user of the host computer 1 operates a memory file (T303), and then issues a memory file unmount to end access to the memory card (T304). The digital MFP 20 confirms that the memory card job has finished, and then issues a disconnection request (T305) to disconnect communication to end the job. At this point, the memory card is assumed to be still attached to the digital MFP 20.

On the other hand, the host computer 2 issues a memory card job processing request to try to access another person's memory card (T310) while the user of the host computer 1 is operating the memory file (T303). Then, when the digital MFP 20 finishes the memory card job processing with the host computer 1, the digital MFP 20 issues a connection request to the host computer 2 (T311), and receives a memory file mount from the host computer 2 (T312).

Then, the digital MFP 20, which has received the memory file mount, returns to the host computer 2 a memory file mount status as a status indicating whether access to the memory file is permitted or denied by the mount status notification unit 323 (T331). In the present example, since the memory card of the user of the host computer 1 is still attached on the digital MFP 20, a memory file mount denial is notified to the host computer 2.

As far as the digital MFP 20 is concerned, since the notification of the memory file mount denial means that the memory card job is completed, the digital MFP 20 issues a disconnection request to the host computer 2 (T315) to end the job.

(B) Memory Card Mount Permission Notification Control to the Host Computer

Next, control relating to a memory card mount permission notification to the host computer will be described with reference to FIG. 7.

The contents described in this section correspond to, of the memory card job processing executed by the host computer 1 described in FIG. 6, the following three points. More specifically, the contents described in this section correspond to internal processing on the digital MFP side arising from the memory file mount (T302), the memory file mount permission notification (T321), and the memory file unmount (T304).

Figure 7:
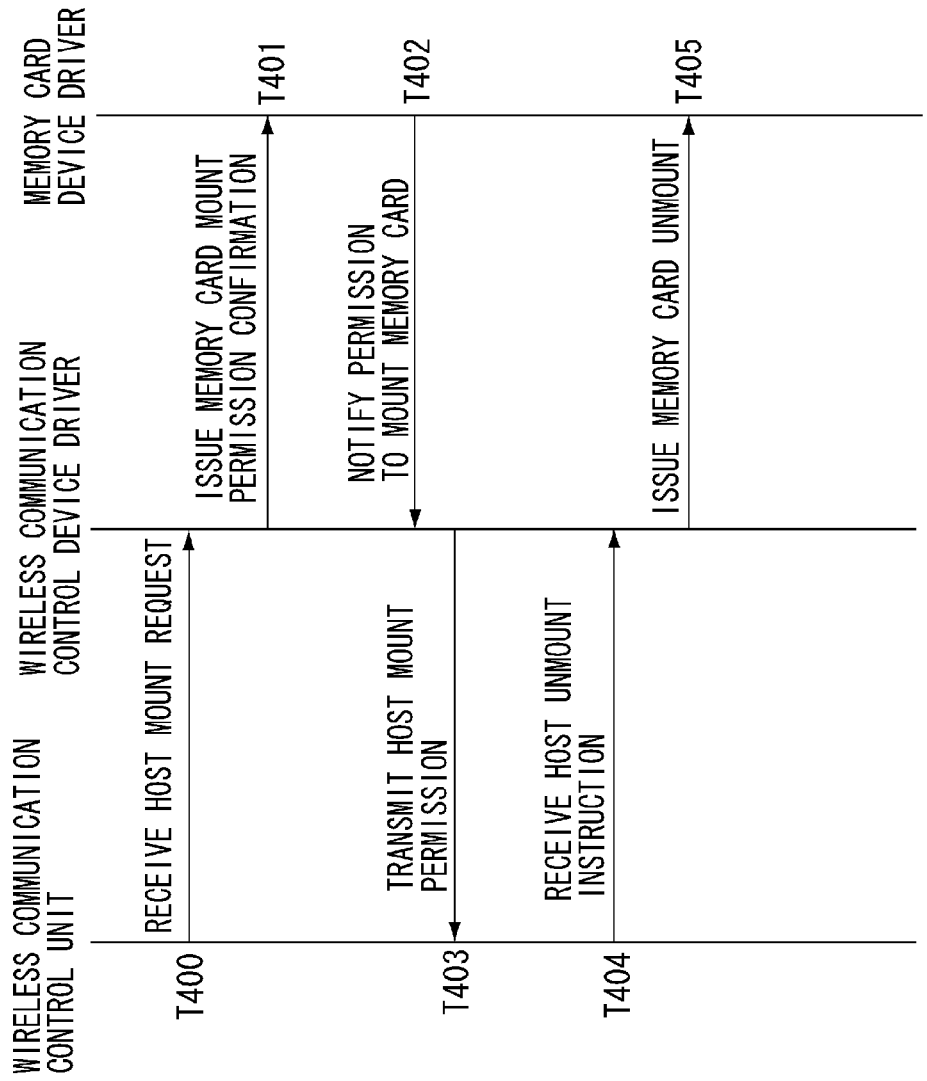
FIG. 7 is a sequence diagram illustrating control relating to memory card mount permission notification to a host computer according to a first exemplary embodiment.

FIG. 7 is a sequence diagram illustrating control relating to the memory card mount permission notification to the host computer according to the first exemplary embodiment. To describe the processing based on the state of the host computer unmount state storing unit 322, a processing relationship between the wireless communication control unit 1600 and each of the device drivers 310 and 320 will be described in order of the sequence steps. The present example is a case in which the host computer unmount state storing unit 322 is in a "false" state, specifically, a case in which a host computer mount request from the host computer is permitted.

When the wireless communication control unit 1600 receives the host computer mount request from the host computer (T400), a memory card mount permission notification is issued from the wireless communication control device driver 310 to the memory card device driver 320 (T401).

Since the host computer unmount state storing unit 322 is in the "false" state, the memory card device driver 320 notifies the wireless communication control device driver 310 of memory card mount permission (T402) using the mount status notification unit 323. Consequently, the wireless communication control device driver 310 controls the wireless communication control unit 1600 to transmit host computer mount permission (T403) to the host computer.

Based on the processing up to this stage, since the host computer could mount the memory card as the file system, the contents of the memory card 240 can be read and written.

When the processing for reading and writing the contents of the memory card 240 is finished, the host computer unmounts the memory file. When the wireless communication control unit 1600 receives a host computer unmount instruction (T404) from the host computer, memory card unmount (T405) is issued from the wireless communication control device driver 310 to the memory card device driver 320. The memory card device driver 320 unmounts the memory card 240 as the file system and sets the host computer unmount state storing unit 322 to a "true" state.

(C) Memory Card Mount Denial Notification Control to the Host Computer

Next, control relating to a memory card mount denial notification to the host computer will be described with reference to FIG. 8.

The contents described in this section correspond to, of the memory card job processing executed by the host computer 2 described in FIG. 6, the internal processing on the digital MFP side arising from the memory file mount (T312) and the memory file mount denial notification (T331).

Figure 8:
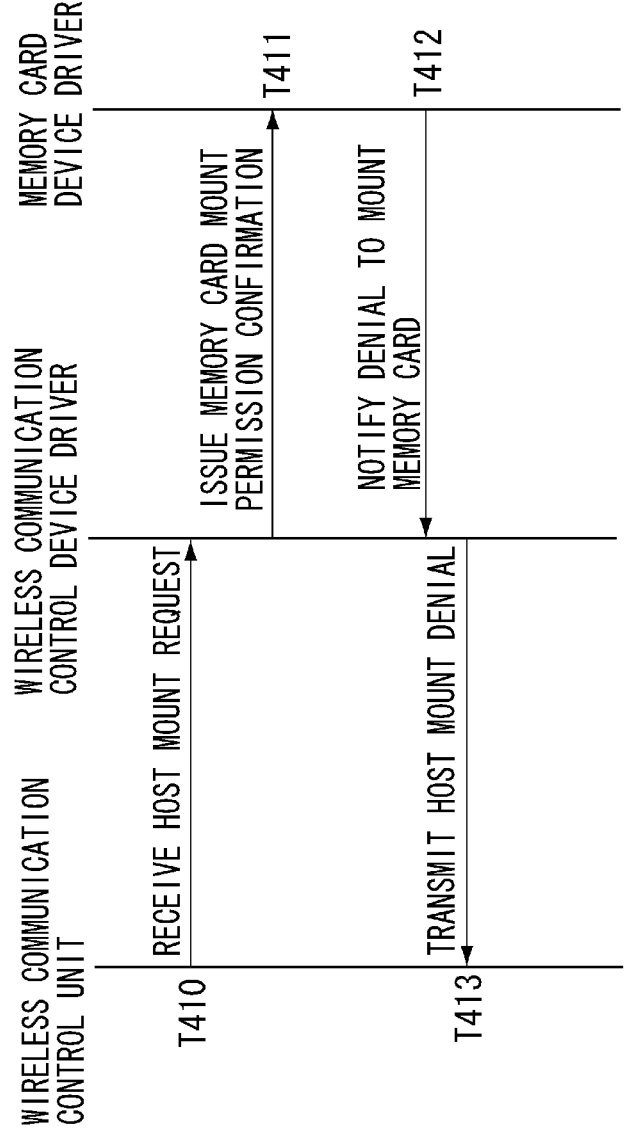
FIG. 8 is a sequence diagram illustrating control relating to memory card mount denial notification to a host computer.

FIG. 8 is a sequence diagram illustrating control relating to the memory card mount denial notification to the host computer.

To describe the processing based on the state of the host computer unmount state storing unit 322, the processing relationship between the wireless communication control unit 1600 and each of the device drivers 310 and 320 will be described in order of the sequence steps. The present example is a case in which the host computer unmount state storing unit 322 is in the "true" state, specifically, a case in which a host computer mount request from the host computer is denied.

When the wireless communication control unit 1600 receives the host computer mount request from the host computer (T410), a memory card mount permission notification (T411) is issued from the wireless communication control device driver 310 to the memory card device driver 320.

Since the host computer unmount state storing unit 322 is in the "true" state, the memory card device driver 320 notifies the wireless communication control device driver 310 of memory card mount denial (T412) using the mount status notification unit 323. Consequently, the wireless communication control device driver 310 controls the wireless communication control unit 1600 to transmit host computer mount denial (T413) to the host computer.

Based on the above processing, the fact that mounting of the memory card 240 was denied is confirmed, and the processing finishes.

(D) Memory File Mount Status Notification Flow

Next, a processing flow for notifying the host computer of the memory file mount status in the digital MFP will be described with reference to FIG. 9.

Figure 9:
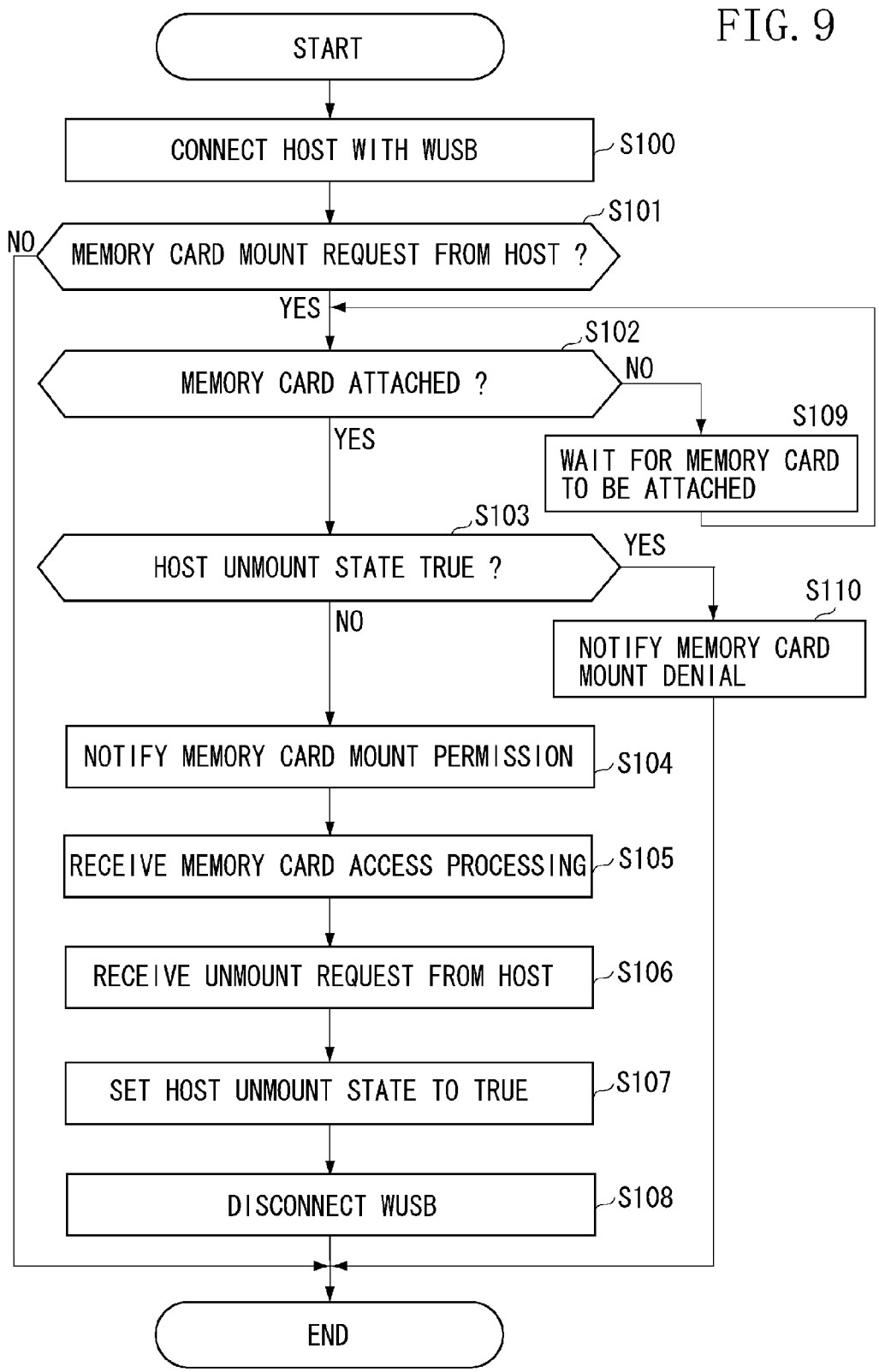
FIG. 9 is a flowchart illustrating a processing flow for notifying a host computer of a memory file mount status in a digital MFP.

FIG. 9 is a flowchart illustrating a processing flow for notifying the host computer of the memory file mount status in the digital MFP. FIG. 9 illustrates the processing contents in the digital MFP for the sequences of FIGS. 7 and 8. All of processes are executed by the controller OS 300 in the digital MFP 20.

First, in step S100, the controller OS 300 establishes a wireless USB (WUSB) communication connection with the host computer, and then the processing proceeds to step S101. In step S101, if there is a memory card mount request from the host computer (YES in step S101), the processing proceeds to step S102. If there is no memory card mount request from the host computer (NO in step S101), the processing finishes.

In step S102, the controller OS 300 confirms whether a memory card is attached. If the memory card is attached (YES in step S102), the processing proceeds to step S103. If the memory card is not attached (NO in step S102), the processing proceeds to step S109. In step S109, the controller OS 300 waits for the memory card to be attached. When the memory card is attached, the processing returns to step S102. According to this step, the controller OS 300 can wait for the user to attach the memory card to the digital MFP 20 main body.

In step S103, the controller OS 300 confirms the state of the host computer unmount state storing unit 322, and if the state is "true" (YES in step S103), the processing proceeds to step S110. In step S110, the controller OS 300 notifies the host computer of mount denial of the memory card 240 by the mount status notification unit 323, and finishes the processing.

In step S103, if the controller OS 300 confirms that the state of the host computer unmount state storing unit 322 is not "true" (NO in step S103), specifically, is "false", the processing proceeds to step S104. In step S104, the controller OS 300 notifies the host computer of mount permission of the memory card 240 by the mount status notification unit 323. In the next step S105, the controller OS 300 receives access processing to the memory card 240 from the host computer, and the processing proceeds to step S106.

In step S106, the controller OS 300 receives an unmount request from the host computer. In the next step S107, the controller OS 300 sets the state of the host computer unmount state storing unit 322 to "true", and the processing proceeds to step S108. In step S108, the controller OS 300 disconnects the wireless USB communication with the host computer, and finishes the processing.

Host Computer Side Processing (A) Memory Card Mount Permission Reception Control Control when the host computer receives a memory card mount permission notification will be described with reference to FIG. 10.

The contents described in this section correspond to, of the memory card job processing executed by the host computer 1 described in FIG. 6, the following three points. More specifically, the contents described in this section correspond to the internal processing on the host computer side arising from the memory file mount (T302), the memory file mount permission notification (T321), and the memory file unmount (T304).

Figure 10:
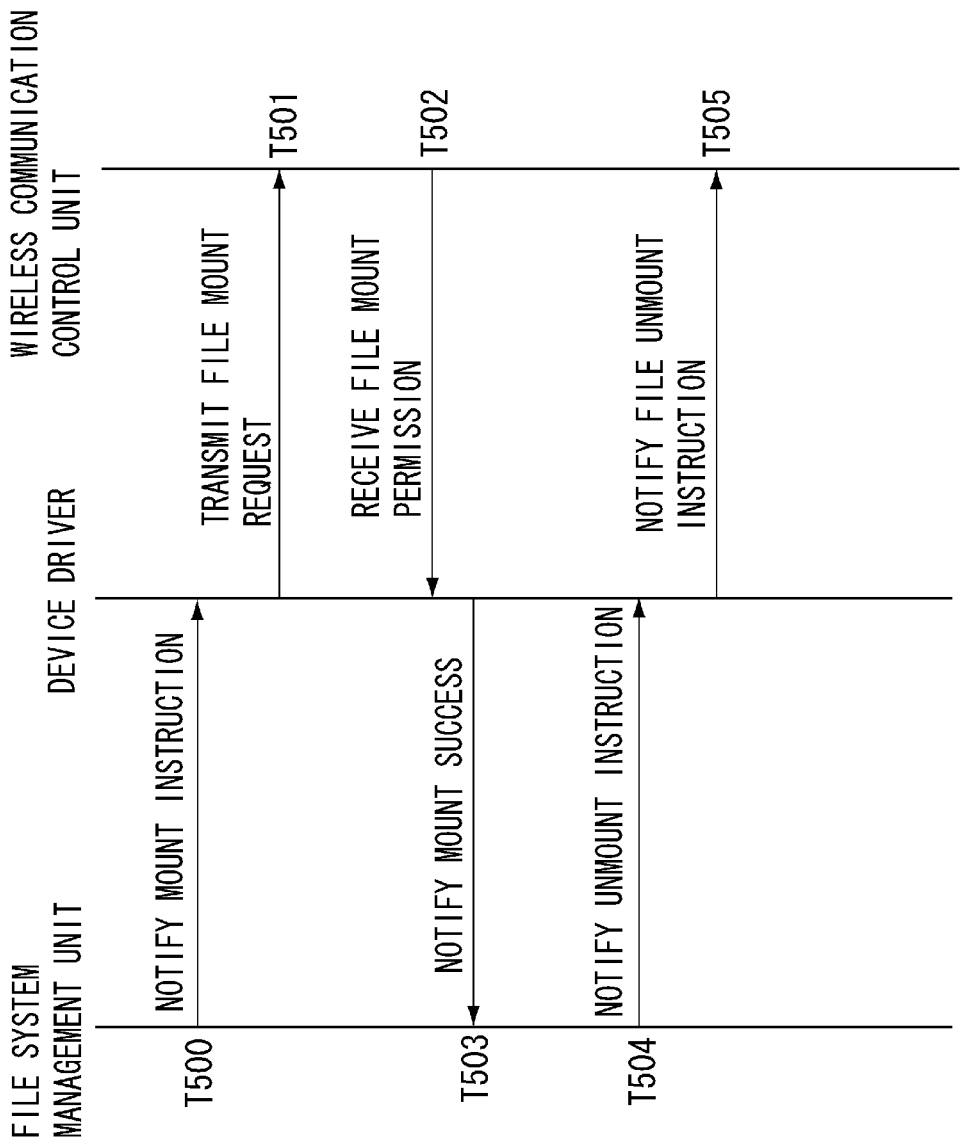
FIG. 10 is a sequence diagram illustrating control relating to memory card mount permission reception on a host computer side.

FIG. 10 is a sequence diagram illustrating control relating to memory card mount permission reception on the host computer side.

To describe the operation state of the file mount control notification unit 172, the processing relationship among the wireless communication control unit 1600, the MFP device driver 170, and the file system management unit 160 will be described in order of the sequence steps.

Amount instruction of the file system management unit 160 by the host computer is notified to the MFP device driver 170 (T500). Consequently, the file mount control notification unit 172 notifies the digital MFP 20 of a file mount request (T501) from the wireless communication control unit 108 via the wireless communication hardware input/output unit 171.

The MFP device driver 170 receives file mount permission (T502) via the wireless communication hardware input/output unit 171. Consequently, the status reception processing unit 173 notifies the file system management unit 160 that mounting was successful (T503). Then, the file system management unit 160 can directly read and write the contents of the memory card mounted on the digital MFP 20 via the file system input/output unit 174 as the file system.

When access to the file system using the memory card 240 between the host computer and the digital MFP 20 is ended, the file system management unit 160 unmounts the file system in order to release the memory card 240 attached to the digital MFP 20. More specifically, an unmount instruction (T504) for the file system management unit 160 from the host computer is notified to the MFP device driver 170.

The file mount control notification unit 172 notifies the digital MFP 20 of the file unmount instruction (T505) from the wireless communication control unit 108 via the wireless communication hardware input/output unit 171.

(B) Memory Card Mount Denial Reception Control

Next, control when the host computer receives a memory card mount denial notification will be described below with reference to FIG. 11.

The contents described in this section correspond to, of the memory card job processing executed by the host computer 1 described in FIG. 6, the internal processing on the host computer side arising from the memory file mount (T312) and the memory file mount denial notification (T331).

Figure 11:
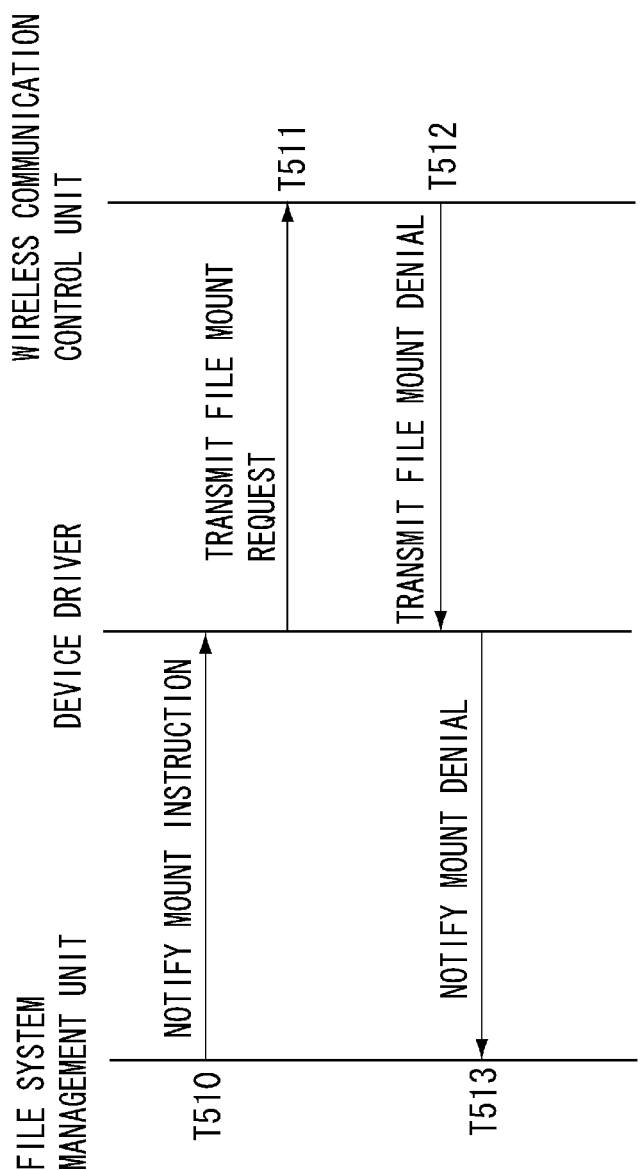
FIG. 11 is a sequence diagram illustrating control relating to memory card mount denial reception on a host computer side.

FIG. 11 is a sequence diagram illustrating control relating to memory card mount denial reception on the host computer side.

To describe the operation state of the file mount control notification unit 172, the processing relationship among the wireless communication control unit 1600, the MFP device driver 170, and the file system management unit 160 will be described in order of the sequence steps.

Amount instruction of the file system management unit 160 by the host computer is notified to the MFP device driver 170 (T510). Consequently, the file mount control notification unit 172 notifies the digital MFP 20 of a file mount request (T511) from the wireless communication control unit 108 via the wireless communication hardware input/output unit 171.

Next, the MFP device driver 170 receives file mount denial (T512) via the wireless communication hardware input/output unit 171. Consequently, the status reception processing unit 173 notifies the file system management unit 160 that mounting was not permitted (T513). The file system management unit 160 recognizes the fact the contents of the memory card 240 attached to the digital MFP 20 could not be mounted as the file system via the file system input/output unit 174.

This means that reading and writing of the contents of the memory card was not permitted.

According to the first exemplary embodiment, after the host computer 1 has finished accessing the memory card 240 attached to the digital MFP 20, reading and writing of the contents of the memory card from another host computer 2 cannot be performed while the memory card 240 is still attached. Consequently, the security of the information in the memory card 240 attached to the digital MFP 20 can be improved.

Further, functions other than access to the memory card 240, for example printing output, are not restricted. Therefore, access to the memory card 240 can be controlled while maintaining advantages of sharing a single device among a plurality of the host computers for functions other than access to the memory card.

In a second exemplary embodiment, the digital MFP 20 stores a host computer identification (ID) for a host computer from which a memory file system has been unmounted. Then, if the host computer unmount state storing unit 322 is set to "true", a mount permission notification of the memory file system is issued if the host computer ID of a newly connected host computer matches the stored host computer ID.

By employing the configuration of the second exemplary embodiment, mounting of the memory file system is always permitted during re-connection to the digital MFP 20 from the same host computer. The second exemplary embodiment will now be described below.

Digital MFP Software Configuration

Figure 12:
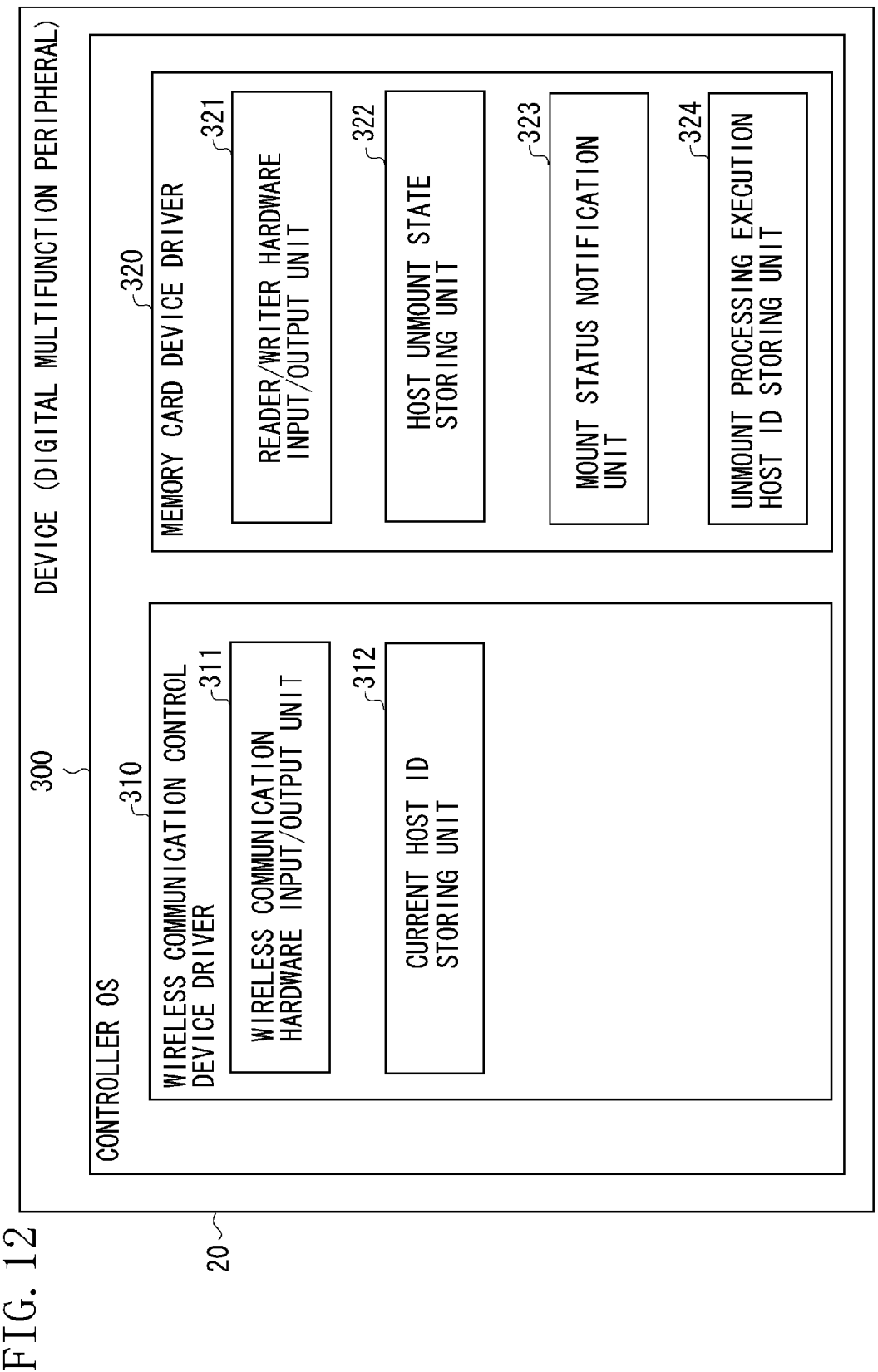
FIG. 12 is a block diagram illustrating a software configuration of a digital MFP according to a second exemplary embodiment.

FIG. 12 is a block diagram illustrating a software configuration of the digital MFP 20 according to the second exemplary embodiment.

As illustrated in FIG. 12, the software loaded in the digital MFP 20 according to the second exemplary embodiment is provided with the controller OS 300. The controller OS 300 includes a wireless communication control device driver 310 and a memory card device driver 320 which have a different configuration from the first exemplary embodiment described using FIG. 3. More specifically, the wireless communication control device driver 310 is provided with a current host computer ID storing unit 312 in addition to the wireless communication hardware input/output unit 311. The memory card device driver 320 is provided with an unmount processing execution host computer ID storing unit 324 in addition to the reader/writer hardware input/output unit 321, the host computer unmount state storing unit 322, and the mount status notification unit 323.

The current host computer ID storing unit 312 of the wireless communication control device driver 310 stores host computer ID information about the host computers while are wirelessly connected. The current host computer ID storing unit 312 is provided to specify the host computer which is currently communicating (an example of a second specifying information storing unit). The host computer ID of the other connection party host computer is set when wireless communication is established, and the stored information is cleared when wireless communication is not connected.

The unmount processing execution host computer ID storing unit 324 of the memory card device driver 320 stores the host computer ID information about the host computer that executed memory file system unmount processing (an example of a first specifying information storing unit).

The digital MFP 20 determines whether a newly reconnected host computer is the same host computer as the host computer that executed the memory file system unmount processing based on two pieces of information, the information stored in the current host computer ID storing unit 312 and the information stored in the unmount processing execution host computer ID storing unit 324. If it is determined that it is the same host computer, mounting of the memory file system is permitted even if detaching of the memory card has not been detected. When it is determined that the host computer is not the same, like in the first exemplary embodiment, this means that the mount request is from another host computer, and thus mounting is denied.

The unmount processing execution host computer ID storing unit 324 sets the stored information of the current host computer ID storing unit 312 based on an unmount instruction for the memory card from the host computer connected to the wireless communication control unit 1600. Further, the unmount processing execution host computer ID storing unit 324 clears the stored information based on a detection state of the card attach/detach detection unit 1710.

More specifically, when unmount processing from the host computer is executed, the unmount processing execution host computer ID storing unit 324 sets the contents of the current host computer ID storing unit 312, and clears those contents when the card attach/detach detection unit 1710 detects detaching of the memory card. In other words, after the unmount processing from the host computer is executed, the unmount processing execution host computer ID storing unit 324 stores the host computer ID of the host computer which executed the unmount processing during the period of detecting memory card detaching.

Memory Card Mount Permission Notification Control to the Host Computer

Next, control relating to a memory file mount permission notification to the host computer will be described with reference to FIG. 13. The contents described in this section are processes performed in the digital MFP 20.

Figure 13:
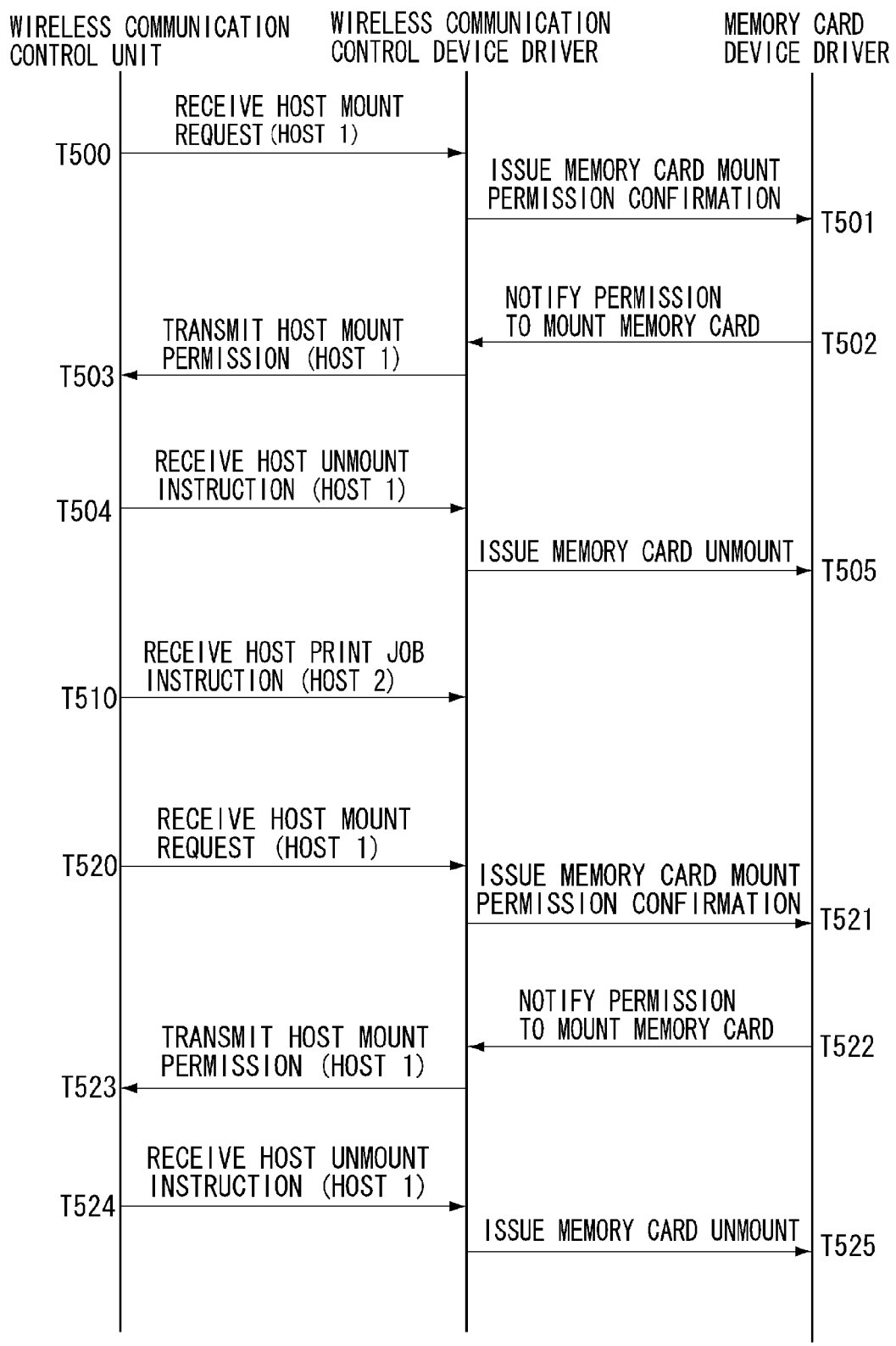
FIG. 13 is a sequence diagram illustrating control relating to memory card mount permission notification to a host computer according to the second exemplary embodiment.

FIG. 13 is a sequence diagram illustrating control relating to the memory card mount permission notification to the host computer according to the second exemplary embodiment.

During the series of sequence steps in the present example, the memory card remains attached to the digital MFP 20.

The processes illustrated in steps T500 to T505 are respectively the same as the processes illustrated in steps T400 to T405 (the memory card job processing) described using FIG. 7. This is a request job from the host computer 1.

Step T510 represents a print job which is a request job from the host computer 2. Since the job is not a memory card job, memory file system mount processing is not involved.

Further, the processes illustrated in steps T520 to T525 are also respectively the same as the processes illustrated in steps T400 to T405 (the memory card job processing) described using FIG. 7. This is also a request job from the host computer 1.

A characteristic feature of the sequence according to the present example is that since the host computer unmount instruction instructed in step T504 is from the host computer 1, host computer mount permission is transmitted to the host computer 1 in step T523 even if the memory card is attached.

Memory File Mount Status Notification Flow in the Digital MFP 20

Next, a processing flow for notifying the host computer of the memory file mount status in the digital MFP will be described with reference to FIG. 14.

Figure 14:
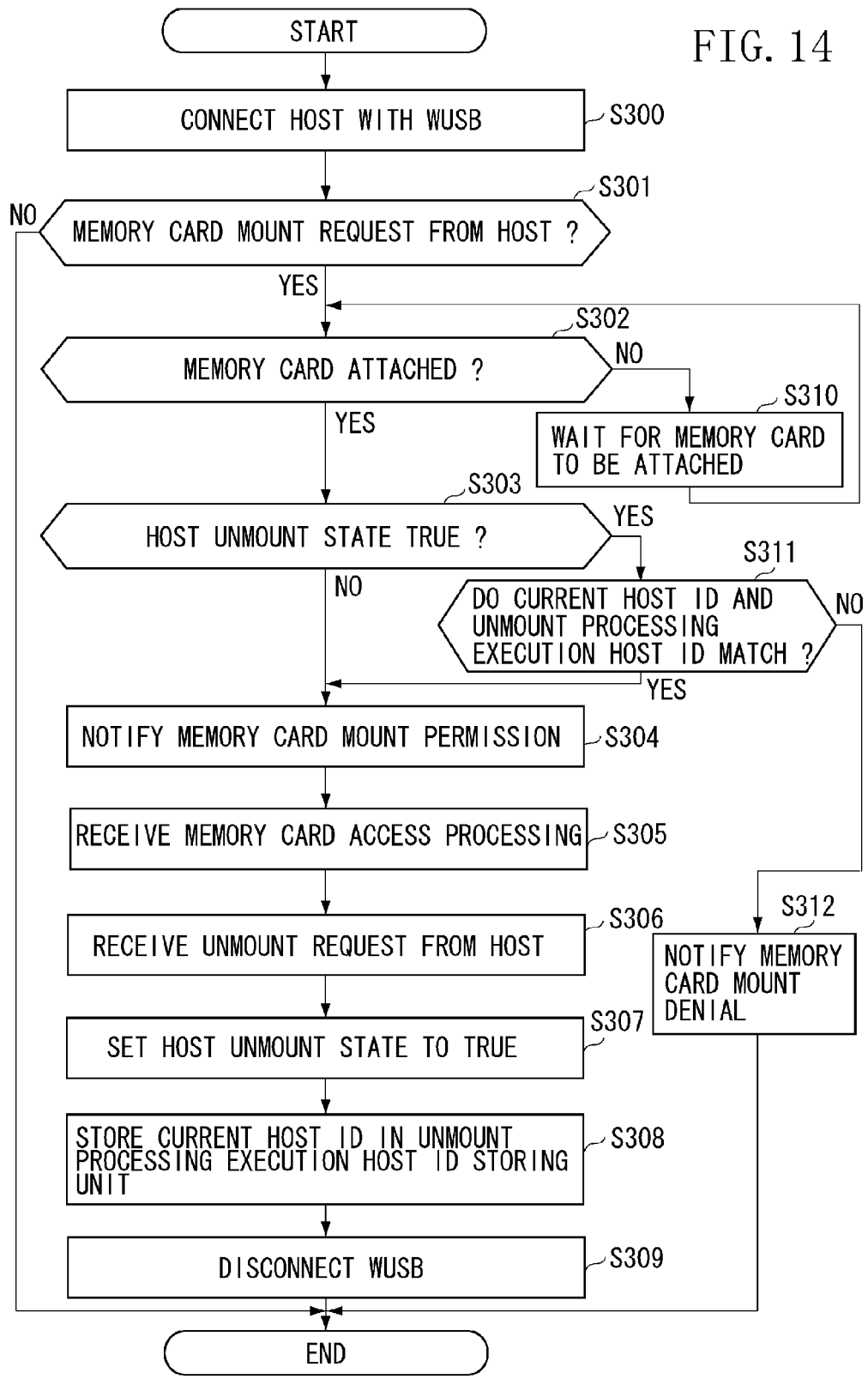
FIG. 14 is a flowchart illustrating processing for notifying a host computer of a memory file mount status in a digital MFP according to the second exemplary embodiment.

FIG. 14 is a flowchart illustrating processing for notifying the host computer of the memory file mount status in the digital MFP according to the second exemplary embodiment.

FIG. 14 illustrates the processing contents in the digital MFP for the sequence of FIG. 13. All of the processes are executed by the controller OS 300 in the digital MFP 20.

The processes of from step S300 to step S303 are respectively the same as the processes of from step S100 to step S103 described using FIG. 9. Further, the process of step S310 is also the same as the process of step S110 of FIG. 9.

In step S303 according to the present exemplary embodiment, the controller OS 300 confirms the state of the host computer unmount state storing unit 322. If the state is "true" (YES in step S303), the processing proceeds to step S311. In step S311, the controller OS 300 compares the contents of the current host computer ID storing unit 312 and the unmount processing execution host computer ID storing unit 324 (determination unit). If the contents are the same (YES in step S311), the processing proceeds to step S304. If the contents are not the same (NO in step S311), the processing proceeds to step S312. In step S312, the controller OS 300 notifies the host computer of memory card mount denial, and finishes the processing.

The processes of from step S304 to step S307 are respectively the same as the processes of from step S104 to step S107 described using FIG. 9.

In step S307 according to the present exemplary embodiment, the controller OS 300 sets the state of the host computer unmount state storing unit 322 to "true", and the processing proceeds to step S308. In step S308, the host computer ID information of the current host computer ID storing unit 312 is stored in the unmount processing execution host computer ID storing unit 324. In step S309, wireless USB communication with the host computer is disconnected, and the processing finishes.

According to the second exemplary embodiment, not only can the same advantages as in the first exemplary embodiment be obtained, but the following specific advantages can also be obtained.

More specifically, according to the second exemplary embodiment, when the memory card is attached to the digital MFP 20, the state of the host computer unmount state storing unit 322 is confirmed. If the state is "true" (step S303), a determination is made as to whether the host computer ID of the host computer which is connected by the wireless communication and the host computer ID of the host computer that executed the memory file system unmount processing are the same. If they are the same, mounting of the memory card by the host computer is permitted. By performing such processing, mounting of the memory file system is always permitted during re-connection to the digital MFP 20 from the same host computer. Therefore, user friendliness can be increased.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-274369 filed Dec. 2, 2009, which is hereby incorporated by reference herein in its entirety.

What is claimed is:

1. A device which includes a communication unit configured to communicate with an external apparatus and a memory card control unit configured to detachably attach a memory card to the device and to control an operation of the memory card, the device comprising:
    a receiving unit configured to receive a request for mounting the memory card from the external apparatus; and
    an access control unit configured to permit mounting of the memory card to a first external apparatus which issues the request, but does not permit mounting of the memory card to a second external apparatus which issues the request after the first external apparatus until the memory card is detached from the device after the first external apparatus unmounts the memory card.

2. The device according to claim 1, further comprising a detection unit configured to detect attaching and detaching of the memory card to and from the device.

3. The device according to claim 1, wherein the communication unit performs wireless USB communication.

4. A method for controlling a device which includes a communication unit configured to communicate with an external apparatus and a memory card control unit configured to detachably attach a memory card to the device and to control an operation of the memory card, the method comprising:
    receiving a request for mounting the memory card from the external apparatus; and
    permitting mounting of the memory card to a first external apparatus which issues the request, but not permitting mounting of the memory card to a second external apparatus which issues the request after the first external apparatus until the memory card is detached from the device after the first external apparatus unmounts the memory card.

5. The method according to claim 4, further comprising detecting attaching and detaching of the memory card to and from the device.

6. The method according to claim 4, wherein the communication unit performs wireless USB communication.

7. A non-transitory computer-readable program for executing a method for controlling a device which includes a communication unit configured to communicate with an external apparatus and a memory card control unit configured to detachably attach a memory card to the device and to control an operation of the memory card, the program comprising:
    receiving a request for mounting the memory card from the external apparatus; and
    permitting mounting of the memory card to a first external apparatus which issues the request, but not permitting mounting of the memory card to a second external apparatus which issues the request after the first external apparatus until the memory card is detached from the device after the first external apparatus unmounts the memory card.

* * * * *